United States Patent [19]

Hughes

[11] Patent Number: 4,969,480

[45] Date of Patent: Nov. 13, 1990

[54] METHOD AND APPARATUS FOR MIXING AND SUPPLYING FOUNTAIN SOLUTION TO PRINTING PRESS

[76] Inventor: Kenneth D. Hughes, P.O. Box 1186, Eden, N.C. 27288

[21] Appl. No.: 182,939

[22] Filed: Apr. 18, 1988

[51] Int. Cl.$^5$ .................. G05D 11/06; G05D 11/08
[52] U.S. Cl. ........................................ 137/3; 137/5; 137/91; 137/93; 137/563
[58] Field of Search .............. 137/3, 5, 91, 93, 563

[56] References Cited

U.S. PATENT DOCUMENTS

| | | | |
|---|---|---|---|
| 3,376,883 | 4/1968 | Douty | 137/93 X |
| 3,557,817 | 1/1971 | Royse | 137/91 |
| 3,947,356 | 3/1976 | Werhli | 137/93 X |
| 4,119,989 | 10/1978 | Carvalko | 137/93 X |
| 4,483,357 | 11/1984 | Rao | 137/91 X |

Primary Examiner—Robert G. Nilson
Attorney, Agent, or Firm—Rhodes, Coats & Bennett

[57] ABSTRACT

A fountain solution supply system for mixing and supplying a fountain solution, having two or more ingredients mixed in precise concentrations, from a reservoir to a printing press. The system includes a high-capacity pump connected to the reservoir. Substantially more than half of the flow of the fountain solution from the pump is directed through a high pressure line to operate a fluidic pump and then returned to the reservoir. The remainder of the fountain solution is directed through a low pressure line to the printing press. The return line from the printing press is connected to a primary intake of the fluidic pump. An electrically-activated, solenoid valve is connected between a secondary intake of the fluidic pump and a supply of at least one of the ingredients of the solution. Control means sense the concentration of the ingredient in the solution and control the actuation of the valve in response to the concentration of the ingredient in the fountain solution to maintain its concentration at a pre-set level.

49 Claims, 4 Drawing Sheets

METHOD AND APPARATUS FOR MIXING AND SUPPLYING FOUNTAIN SOLUTION TO PRINTING PRESS

BACKGROUND AND SUMMARY OF THE PRESENT INVENTION (1) Field of the Invention

The present invention relates in general to printing and, more particularly, to an apparatus for supplying printing presses with a fountain solution.

(2) Description of the Prior Art

In the lithographic printing process, a plate carries an etched image that is ink receptive and the ink on this image is transferred to a surface that may be on paper or some other material, thereby imparting the image to the surface. The fountain solution, which is primarily water, settles over the blank areas of the plate and renders those areas ink repellent.

The typical fountain solution includes a fountain etch concentrate, water, and from ten to thirty percent by volume of isopropyl alcohol. The fountain etch concentrate includes an acidic component, such as phosphoric acid or citric acid, buffering salts, and a water-soluble resin or gum, such as gum arabic or cellulose gum.

A dampening or moistening system transfers the fountain solution from an open tray containing the fountain solution to the plate cylinder of the lithographic printing press. In such systems, one of the problems is that the open tray permits evaporation of the isopropyl alcohol wetting agent in the fountain solution to the atmosphere or ambient air. The wetting factor changes very little above twenty volume percent isopropyl alcohol, however, it changes greatly at low percentages. Thus, precise alcohol control is necessary in order to reduce the alcohol content to the ten volume percent range or lower. Lower alcohol levels result in an improved ink to water balance, thereby permitting easier to print half-tones and solids. In addition, a lower level of wetting agent results in quicker drying times which permits faster press speeds. Finally, lower alcohol levels reduce the alcohol odor in the press room.

Systems have been developed for supplying a properly mixed fountain solution to the press automatically, but these systems have not always performed satisfactory.

Many of these systems have been simple mechanical metering systems, such as a float and shut-off valve. Since such systems are pre-set, it is difficult to monitor the metering system so one never knows if the fountain solution is properly mixed.

Another more sophisticated system operated on the electrical conductivity principle, with the amount of additive that is introduced into the water being determined by the electrical conductivity of the fountain solution that has been produced. This technique may produce misleading results when more than one chemical is added, particularly where each has some effect on the electrical conductivity of the solution.

A more successful approach has been to monitor the specific gravity of the fountain solution directly and attempt to maintain the proper specific gravity of the solution by adding alcohol to the fountain solution as the specific gravity of the fountain solution changes.

One particularly well-known such system is disclosed in U.S. Pat. No. 3,557,817 to Edwin H. Royce, entitled "Control for Mixing Fluids of Different Specific Gravity", issued Jan. 26, 1971. The Royce system included a test chamber having a hydrometer freely floating in a sample solution drawn from the mixing chamber. An electrical conductor is on the hydrometer which moves with the hydrometer relative to the surface of the sample solution and is operable to actuate a relay to open or close a solenoid control valve which regulates the flow of alcohol to the mixing chamber.

Another such apparatus, based on the same principle, is disclosed in U.S. Pat. No. 3,848,618 also to Edwin H. Royce, entitled "Apparatus for Mixing Fluids of Different Specific Gravity", issued Nov. 19, 1974. This control system includes a U-shaped tube, one leg containing controlled liquid having a desired specific gravity and the other liquid having a sample solution circulating therethrough. As specific gravity of the sample solution changes, the surface of the control liquid makes or breaks a contact with an electrode connected to the apparatus to eject the less dense liquid into the sample solution.

In addition to the importance of controlling the volume percent of isopropyl alcohol, printing problems may also occur when the fountain solution pH deviates significantly above or below the pH range of between 4.5 and 5.5. Water soluble resins or gums, such as gum arabic, are present in the fountain etch concentrate and function as hydrophylic (waterloving) polymers, thereby helping to maintain hydrophylicity and prevent ink pickup in a background area. Gum arabic, for example, demonstrates maximum absorption to the non-image area at approximately a pH value of 4.4. Since the isopropyl alcohol is neutral, it has been the past practice to premix the fountain etch concentrate with water in a batch mode, adjust the water-fountain etch concentrate solution to the proper pH, and then add the appropriate volume percent of isopropyl alcohol by one of the methods discussed above. The pH value of the fountain solution is then occasionally checked by litmus paper.

Certain disadvantages become apparent with the above methods. First, the mechanical metering methods have an accuracy of approximately 3 percent, which is adequate to maintain the volume percent of the isopropyl alcohol near twenty percent, but is not sufficiently accurate to maintain the alcohol volume percent in the preferred range of ten percent.

Still another disadvantage with the present systems is that the fountain solution etch concentrate-water solution has been premixed prior to use.

It has thus become desirable to develop an apparatus for mixing and supplying fountain solution to printing presses which will provide precise proportioning of the mixed liquid ingredients of the fountain solution with consistently repeatable results while at the same time eliminating the need for premixing the fountain etch concentrate with water by automatically maintaining the pH of the fountain solution at a prescribed limit.

SUMMARY OF THE INVENTION

The present invention solves the aforementioned problems associated with the prior art by providing a fountain solution supply system which is operable to mix and supply a fountain solution having two or more ingredients mixed in precise concentrations to a printing press. According to the present invention, the fountain solution is first withdrawn from the reservoir by a single high-capacity, circulation pump and forced through an equalization flow tap which divides the flow of the fountain solution from the pump into a high pressure line and a low pressure line. Substantially more than half of the flow of the fountain solution is directed through the high pressure line to operate at least one fluidic pump and then returned to the reservoir. The remainder of the fountain solution is directed through the low pressure line to the printing press for conventional usage therein. The return line from the printing press is connected to the primary intake of the aforesaid fluidic pump and returned to the reservoir. This arrangement is operable to completely recycle approximately half of the fountain solution through the high pressure line approximately every 30 seconds which provides for more reliable control of the fountain solution due to the high rate of recycling. In addition this particular arrangement allows the reservoir and circulation system to be easily isolated from the printing press thereby allowing the fountain solution to first be stabilized prior to its delivery to the printing press. Finally, directing substantially more than half the fountain solution through the high pressure line and the fluidic pump permits the use of a single circulation pump while, at the same time, providing substantially constant return suction at the intake of the fluidic pump.

In the preferred embodiment, pH and specific gravity sensors are used to measure the ph and specific gravity of the fountain solution flowing through the low pressure line between the tap to the press and provide electrical signals indicative of the pH and specific gravity of the solution to a controller. Alcohol and fountain etch concentrate supplies are connected in parallel to individually controlled, electrically-activated, solenoid valves. Preferably there are a pair of fluidic pumps in parallel in a pair of high pressure lines between the tap and the reservoir. The outlets of the solenoid valves are connected to secondary intakes of the aforesaid pair of fluidic pumps connected in parallel. The controller selectively operates the solenoid valves in response to the electrical signals to automatically deliver precise amounts of alcohol and/or fountain etch concentrate to the secondary intakes of the fluidic pumps. There they are mixed with the recycling fountain solution which is being returned to the reservoir.

In addition, a float and switch assembly located in the reservoir is connected to another electrically-activated solenoid valve which permits additional tap water to enter the reservoir when the level of fountain solution in the reservoir falls below a pre-set valve. Thus, the present invention is operable to provide precise mixing of the fountain solution with consistently repeatable results and, at the same time, does not require the fountain etch concentrate-water solution to be premixed prior to use.

Accordingly, one aspect of the present invention is to provide a fountain solution supply system which is operable to mix and supply a fountain solution to a printing press with a high degree of precision.

Another aspect of the present invention is to provide a circulation system for a fountain solution supply system which does not require that the fountain etch concentrate-water solution be premixed prior to use.

Still another aspect of the present invention is to provide a control system for a fountain solution supply system which is operable to maintain the proportions of alcohol, fountain etch concentrate, and water at pre-set levels.

These and other aspects of the present invention will be more clearly understood after review of the following description of the preferred embodiment of the invention when considered with the drawings.

DESCRIPTION OF THE PREFERRED EMBODIMENTS

Figure 1:
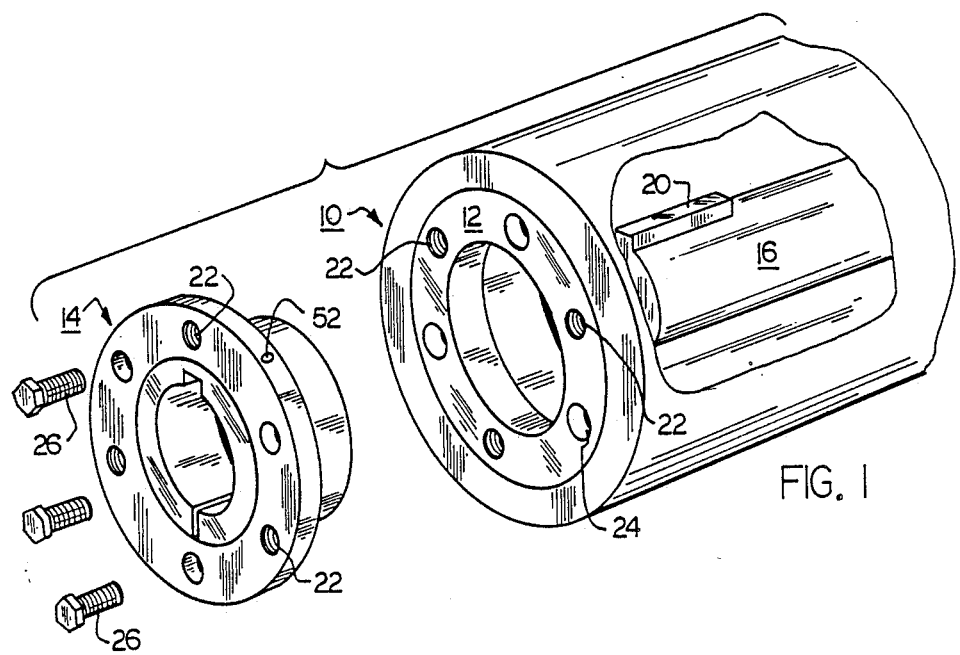
FIG. 1 is a diagramatic view of the present invention illustrating the cooperative relationship between the cooling, fluid circulating, and fountain solution control systems.

Referring now to the drawings in general and to FIG. 1 in particular, it will be understood that the illustrations are for the purpose of describing a preferred embodiment of the invention and are not intended to limit the invention hereto.

As best seen in FIG. 1, the fountain solution supply system, generally designated 10, of the present invention is shown. The fountain solution supply system 10 includes a reservoir 12. Reservoir 12 is constructed of stainless steel to resist the mildly corrosive nature of the fountain solution. The size of reservoir 12 is dependent upon the number and demand of presses (not shown). For example, a 12-gallon reservoir has sufficient capacity to supply two press fountains. A pump inlet line 14 is connected to the bottom of reservoir 12 and to a pump 16. Any one of a number of pumps are suitable but one pump which is particularly well-suited is a Model No. 1P800B, available from the Teel-Dayton Co. of Chicago, Ill. Pump outlet line 18 is connected to the outlet of pump 16. The inlet diameter of pump 16 is approximately one-half inches in diameter and the outlet is approximately one and one-quarter inches in diameter for a one-horse power, electrically powered pump. A 3-position, 4-way control valve 22 is positioned in the pump outlet line 18. Valve 22 is a control valve such as Part No. 98S, available from Automotive Fasteners, of Greensboro, North Carolina, which is constructed of a fountain solution resistant material, such as PVC plastic. A supply line 24 is connected to a first outlet of control valve 22. The other end of supply line 24 is connected to fountain solution pan 26. Pan 26 is conventional in design. Return line 28 is connected to pan 26. Bypass line 30 is also connected to a second record output position of control valve 22 and also connected to reservoir 12. A more detailed description of control valve 22 is found below.

A control valve switch 32 is mounted to control valve 22 and is actuated by the handle of control valve 22 (not shown). First control signal line 34 is connected between control valve switch 32 and a float and switch assembly 36 located inside reservoir 12 One suitable float and switch assembly is Model No. LV91 available from Omega Engineering, of Stanford, Conn. Float and switch assembly 36 is activated in response to changes in the level of the solution in reservoir 12. A second control line 42 is connected from float switch assembly 36 to a first solenoid 44. A water inlet line 46 is connected to a source of tap water (not shown) and to the first solenoid 44. Water outlet line 48 is connected between first solenoid 44 and reservoir 12. A drain line 50 is connected to a third outlet of control valve 22.

A high temperature refrigeration unit 52 is located nearby the reservoir 12. A coolant supply line 54 extends from high temperature refrigeration unit 52 to a coil unit 56 located within reservoir 12. A coolant return line 58 returns coolant from coil unit 36 back to high temperature refrigeration unit 52. The refrigeration unit is conventional in design and may be any of a number of different models, for example a Model No. BM007411, manufactured by the Bristol Company of Bristol, Tennessee. Refrigeration unit 52 includes a thermostat control (not shown) which is operable to maintain the fountain solution in reservoir 12 a pre-set temperature. A conventional air filter 60 is located adjacent to the air intake for refrigeration unit 52.

An equalization flow tap 62 is connected downstream of pump outlet line 18. The constructing of equalization flow tap 64 is discussed in more detail below. The high pressure line 64 is connected to equalization flow tap 62. A low pressure line 66 is also connected to equalization flow tap 62. Low pressure line 66 operates at approximately five PSI and delivers one and one-half to two gallons per minute of fountain solution to control valve 22. High pressure line 64 operates at between 20 and 35 PSI and is connected to fluidic pump 68. Fluidic pump 68 is discussed in more detail below. The inlet of fluidic pump 68 is connected to return line 28. The output of fluidic pump 68 is connected to fluidic pump output line 72. Fluidic pump outlet line 72 is connected back to reservoir 12.

In a preferred embodiment, a tee-connector 74 is located between low pressure line 66 and control valve 22. A sample line 76 is connected to tee connector 74 to permit a sample of the fountain solution to be taken. Sample line 76 is connected to a sensor assembly 78. Sensor assembly 78 includes a specific gravity sensor 79 and a pH sensor 80 (not shown). In the preferred embodiment pH sensor 80 is a Model No. J56-56-00, manufactured by Cole-Parmer, of Chicago, Illi. Specific gravity sensor 79 may be a conventional hydrometer-actuated device. For example, one suitable sensor is shown in U.S. Pat. No. 3,557,817 as discussed above.

Specific gravity sensor 79 provides a specific gravity signal 82 to controller 86 which is indicative of the specific gravity of fountain solution in reservoir 12. Similarly, pH sensor 80 provides a pH signal 84 to controller 86. Controller 86 may also be conventional in design, for example, a Model SYSMAC-S6 programable controller, sold by Omrom Electronics of Schaumbrug, Ill. Controller 86 provides a control signal along second control line 88 to second solenoid 92. The outlet of second solenoid 92 is connected by line 116 to the inlet of fluidic pump 68. The inlet to second solenoid valve 92 is connected by inlet line 94 to the isopropyl alcohol supply. As discussed below, in the preferred embodiment, separately controlled solenoids are utilized to control the supply of alcohol and fountain etch concentrate to the reservoir 12.

Figure 2:
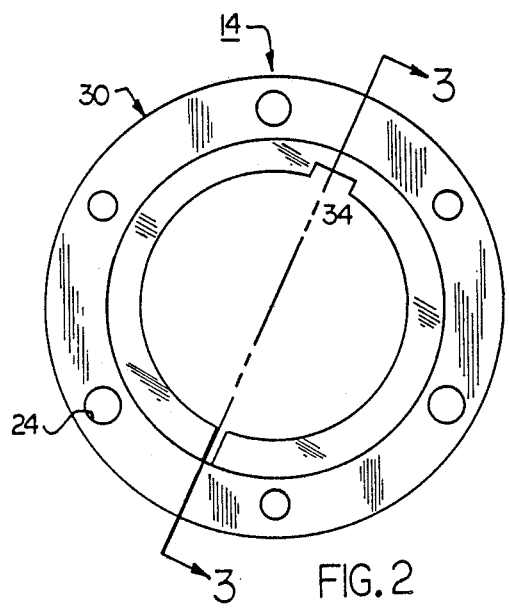
FIG. 2 is a diagramatic view of the circulation system of the present invention configured for two press fountains.

Turning now to FIG. 2, a diagramatic view of the circulation system of the fountain solution supply system shown in FIG. 1 is illustrated. As discussed above, pump 16 is connected to reservoir 12 by means of pump inlet line 14. Pump outlet line 18 is connected to pump 16 and also to equalized flow tap 62. Equal flow tap 62 is constructed from a corrosion resistant plastic such as PVC. The inside diameters A, B and C of tap 62 are selected such that the pressures and flow water of output lines 64 and 65 will be equal. For example, in the preferred embodiment inside diameter A is one inch, inside diameter B is three-quarters inch, inside diameter C is one half inch and the inside diameter of force inlet line 94 and second inlet line 95 are both three-eighths inch.

When pump 16 is run in its preferred operating range of twenty to thirty five PSI, tap 62 will provide substantially equal pressures and flow water along lines 64 and 65. And, in addition, will provide an approximately one-half to two gallons per minute flow through a low pressure line 66.

In the preferred embodiment, tee connector 74 is connected downstream of tap 62 and provides a sample of the fountain solution being sent to the presses to sensor assembly 78 by means of sample line 76. Other sampling locations may also be satisfactory depending on the sampling conditions. Low pressure line 66 is connected to control valve 22. Control valve 22 is the four-way, 3-position type. In position number one, the flow from low pressure line 66 is directed to supply line 24. In position number two, the flow from low pressure line 66 is directed through by-pass line 30 back to reservoir 12. In position number 3 fluid from low pressure line 66 is directed to drain line 50.

Control valve 22 also includes a control valve switch 32 which is activated when control valve 22 is in position number three. Control valve switch 32, which may be, for example, a cam operated microswitch, may be of either the normally opened or normally closed type depending on the operation of solenoid 44. First control line 34 is connected to control valve switch 32 and float and switch assembly 36 in series with line 42 and first solenoid 44, such that when control valve 22 is in position number three, the float and switch assembly 36 is prevented from actuating solenoid valve 44 via line 42. This enables reservoir 12 to be drained through line 50 without solenoid 44 opening and adding additional tap water to reservoir 12 via line 46.

Supply line 24 may be connected to a header assembly 96 when necessary to better control the flow of the fountain solution to multiple press fountains. Header 96 is connected to first pan supply lines 98. First pan supply lines 98 are connected to three-eighths inch ball-valves 102 which enable the flow to pans 26 and 27 to be manually cut on and off, when required.

Second pan supply lines 104 receive the fountain solution from ball valves 102 and are connected to adjustable flow rate valves 106. This configuration allows individual flow to pans 26 and 27 to be turned on and off by means of ball valves 102 and then returned to the preset flow rates set by adjustable flow valves 106. Third pan supply lines 108 are connected to the adjustable flow rate valves 106 to pans 26, 27. Pans 26 and 27 are connected to return lines 28 and 29, respectfully. Return lines 28 and 29 are connected to the inlets are fluidic pumps 68, 69, respectively. The output of fluidic pump 68 is directed through fluidic pump output line 72 to one of filters 112. Similarly, the output from fluidic pump 69 is directed through fluidic output line 73 to another of filters 112. Filters 112 are conventional cannister filters and operate to trap suspended particulates and break up foam bubbles which may be present in fluidic output lines 72 and 73.

In operation, pump 16 receives fountain solution from reservoir 12 through pump inlet line 14. The fountain solution is pumped by pump 16 through outlet line 18 to equalized flow tap 62. When pump 16 is run in the preferred operating range of twenty to thirty five PSI, tap 62 provides substantially equal pressures and flow rates of the fountain solution through lines 64 and 65 and, in addition, provides approximately one-half to two gallons per minute flow through low pressure line 66.

Tee-connector 74 downstream of tap 62 provides a sample of the fountain solution being sent to the presses to sensor assembly 78 by means of sample line 76. Substantially less than half of the fountain solution from pump 16 flows through low pressure line 66 to control valve 22. In position number one, the flow from low pressure line 66 is directed to supply line 24. In position number two, the flow from low pressure line 66 is directed through by-pass line 30 back to reservoir 12. In position number 3 fluid from low pressure line 66 is directed to drain line 50. Control valve switch 32 is activated when control valve 22 is in position number three. When control valve 22 is in position number three, the float and switch assembly 36 is prevented from actuating solenoid valve 44 thereby enabling reservoir to be drained through line 50 without solenoid 44 opening and adding additional tap water to reservoir via line 46.

Fountain solution flows through supply line 24 to header assembly 96 and then to first pan supply lines 98. Ball valves 102 enable the flow of fountain solution to pans 26 and 27 to be manually cut on and off.

Second pan supply lines 104 receive the fountain solution flow from ball valves 102. Adjustable flow valves 106 are pre-set to adjust the flow rate to pans 26 which allows individual flow to pans 26 and 27 to be turned on and off via valves 102 and then returned to the pre-set flow set by adjustable flow valves 106. Third pan supply lines 108 receive the fountain solution from adjustable flow valves 106 to pans 26, 27. Pans 26 and 27 return excess fountain solution through return lines 28 and 29, to the inlets of fluidic pumps 68, 69 respectfully. Fluidic pump 68 then forces the solution is directed through fluidic pump output line 72 and through filter 112. Similarly, the fountain solution output from fluidic pump 69 is forced through fluidic output line 73 through second filter 112. Filters 112 are suspended particulates and break up foam bubbles which may be present in fluidic output line 72 and 73.

When control valve 22 is in position number two, the entire output of pump 16, other than the flow of fountain solution to sensor assembly 78, is recycled through reservoir 12 without first passing through supply line 24 to pans 26, 27. This closed-loop operating arrangement allows the control system 10 to stabilize the fountain solution in reservoir 12 rapidly due to the high rate of turnover of the fountain solution to reservoir 12. Recycle times are typically less than one minute and, preferably less than 30 seconds. In addition, since the majority of the fountain solution flow is recycled during normal operation, the log time of correcting deviations in the solution is significantly reduced.

Figure 3:
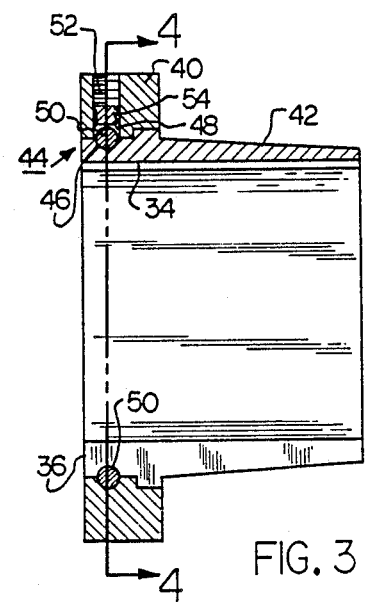
FIG. 3 is a diagramatic view of the fountain solution control system of the present invention configured for both alcohol and etch control.

Turning finally to FIG. 3, a diagramatic view of the fountain solution control system for the present invention is shown. As was previously discussed, pump inlet line 14 is connected to reservoir 12 and to pump 16. The output of pump 16 is connected to pump outlet line 18. Pump outlet line 18 is connected to equalized flow tap 62. High pressure lines 64 and 65 are connected to fluidic pumps 68 and 69, respectfully. Low pressure line 66 is connected to equalized flow tap 62 into tee-connector 74. Sample tee-connector 74 is connected to the sample line 76. The output of sample line 76 is received by sensor assembly 78.

Sensor assembly 78 includes a specific gravity sensor 79 and a pH sensor 80, as discussed above. Controller 86 receives specific gravity signal 82 and pH signal 84 from specific gravity sensor 79 and pH sensor 80, respectfully. Controller 86 provides a control signal along control signal line 88 to solenoid 92. In the preferred embodiment controller 86 is configured to provide a pulsed on and off signal to solenoid 92 to correct small deviations in the specific gravity of the fountain solution. In addition, controller 86 is also configured to open or close solenoid valve 92 completely when the specific gravity signal from specific gravity sensor 78 exceeds or falls below the preset limits.

The inlet of solenoid valve 92 is connected by inlet line 94 to the isopropyl alcohol supply solution. The outlet of solenoid valve 92 is connected by solenoid outlet line 116 to fluidic pump 68. The inlet of fluidic pump 68 is connected to high pressure line 64 and the outlet of fluidic pump 68 is connected by fluidic pump output line 72 to filter 112.

In a similar manner, controller 86 provides a control signal representative of the pH value of the fountain solution by means of control signal line 89 to solenoid valve 93. The inlet of solenoid valve 93 is connected to inlet line 95. Inlet line 95 is connected to the fountain etch concentrate supply (not shown). Solenoid valve 93 is connected to solenoid output line 117. Solenoid line 117 is connected to fluidic pump 69. The inlet of fluidic pump 69 is connected to high pressure line 65. The output of fluidic pump 69 is connected by fluidic pump output line 73 to filter 112.

In operation, the output of fountain sample line 76 is received by sensor assembly 78. Sensor assembly 78 provides controller 86 specific gravity signal 82 and pH signal 84 from specific gravity sensor 79 and pH sensor 80 which are indicative of the specific gravity and pH of the fountain solution.

Controller 86 provides a first control signal along control signal line 88 to solenoid 92 which is dependent on the value of the specific gravity of the fountain solution. In the preferred embodiment controller 86 is configured to provide a pulsed on and off signal to solenoid 92 to correct such deviations in the specific gravity. In addition, controller 86 will also open or close solenoid valve 92 completely when the specific gravity signal 84 from specific gravity sensor 78 exceeds or falls below pre-set limits.

The inlet of solenoid valve 92 is connected by inlet line 94 to the isopropyl alcohol supply solution and permits isopropyl alcohol to flow through solenoid valve 92 in response to a control signal from controller 86 which indicates a positive deviation in the specific gravity of the fountain solution. The alcohol solution flows through valve 92 through solenoid outlet line 116 to first fluidic pump 68. The alcohol solution from outlet line 116 is mixed with the fountain solution from high pressure line 64 and return line 28 by the action of fluidic pump 68. The output fluidic pump 68 is forced through fluidic pump output line 72 and through filter 112.

In a similar manner, controller 86 provides a control signal representative of the pH value of the fountain solution by means of control signal line 89 to solenoid valve 93. The inlet of solenoid valve 93 is connected by solution inlet line 95 to fountain etch concentrate supply and permits fountain etch concentrate to flow through solenoid valve 93 in response to a control signal 89 from controller 86 which indicates a positive deviation in pH of the fountain solution. The etch concentrate flows through solenoid valve 93 and through outlet line 117 to fluidic pump 69. The etch concentrate from outlet line 117 is mixed with the fountain solution from high pressure line 65 and return line 29 by the action of fluidic pump 69. The output of fluidic pump 69 is then forced through fluidic pump output line 72 and through filter 112.

Figure 4:
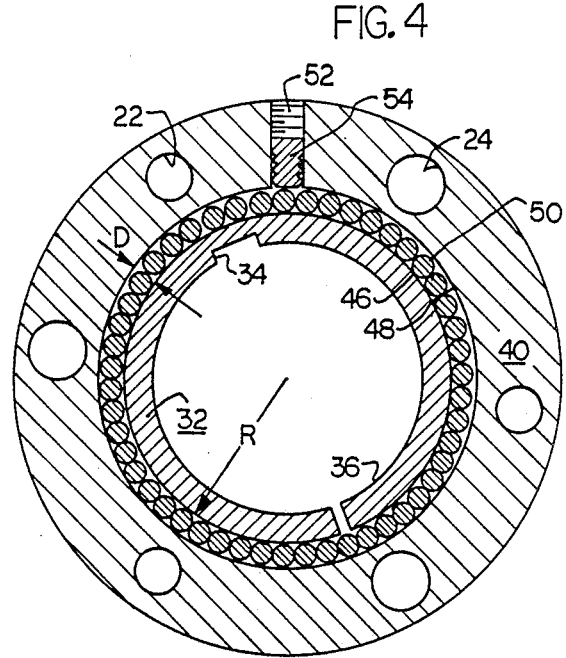
FIG. 4 is an exploded view of the fluidic pump shown in FIGS. 1 through 3.

An exploded view of fluidic pump 68 is shown in FIG. 4. The pump 68 includes a cylindrical injector body 120 which is attached to a cylindrical venturi body 122. In the preferred embodiment, the attachment means included a plurality of machine screws 124 which pass through openings 126 in injector body 120 and are received by tapped openings 128 in venturi body 122. Injector body 120 is also tapped to receive a three-eighths inch NPT fitting 132 which is connected to high pressure line 64. Venturi body 122 is tapped to receive a three-eighths inch NPT fitting 134 and a one-eighth inch FPT fitting 136 which receive fountain solution from return line 28 and alcohol from solenoid 92, respectfully. The outlet of venturi body 122 is tapped to receive a three-eighths inch NPT fitting 138 which is connected to fluidic pump output line 72.

Figure 5:
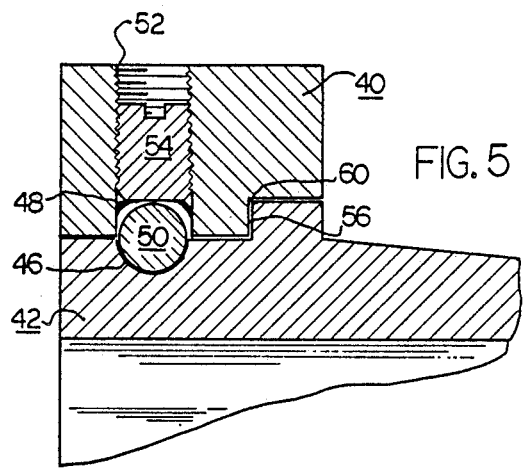
FIG. 5 is a longitudinal sectional view of the fluidic pump of FIG. 4.
Figure 1:
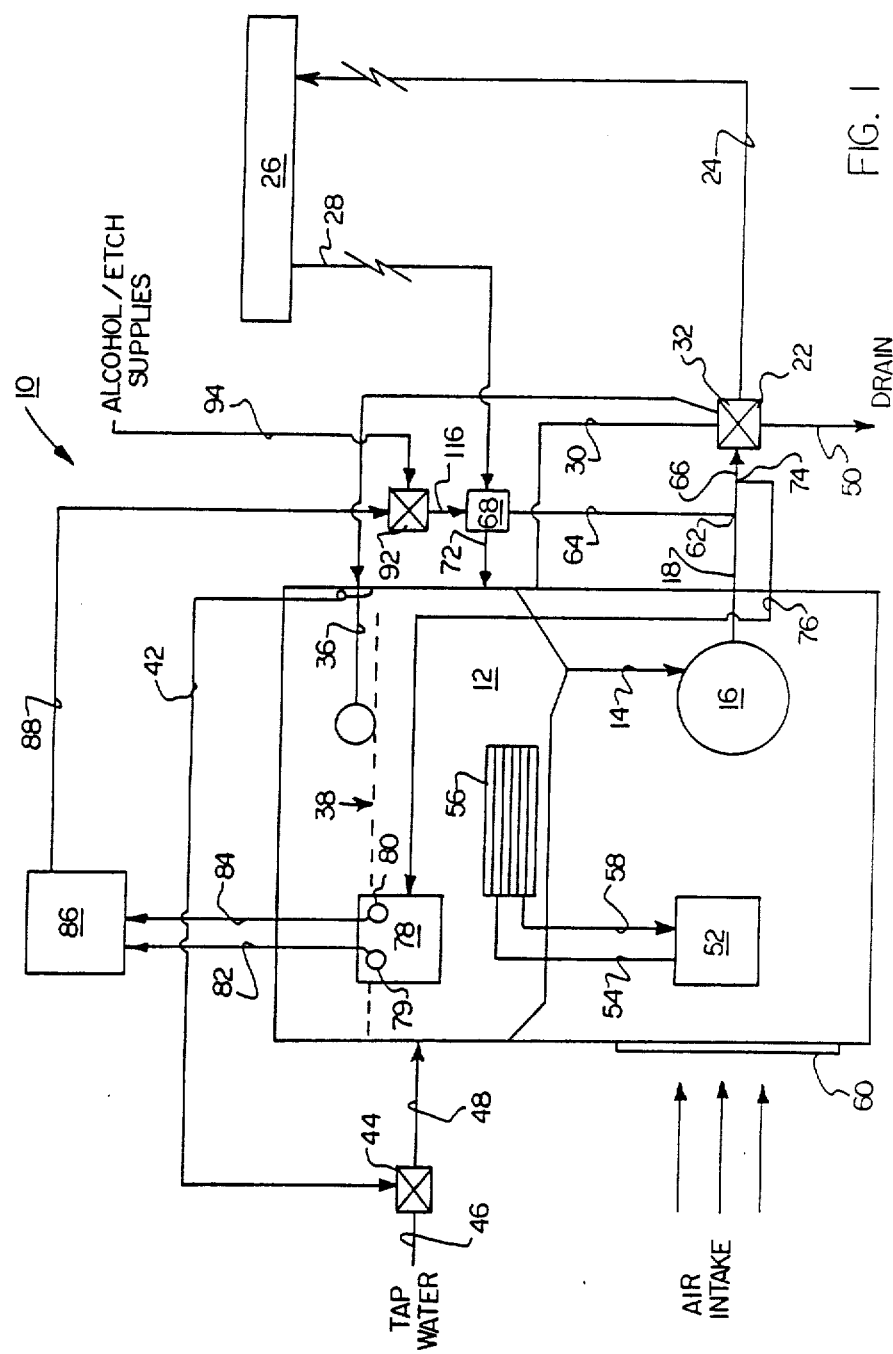
Figure 2:
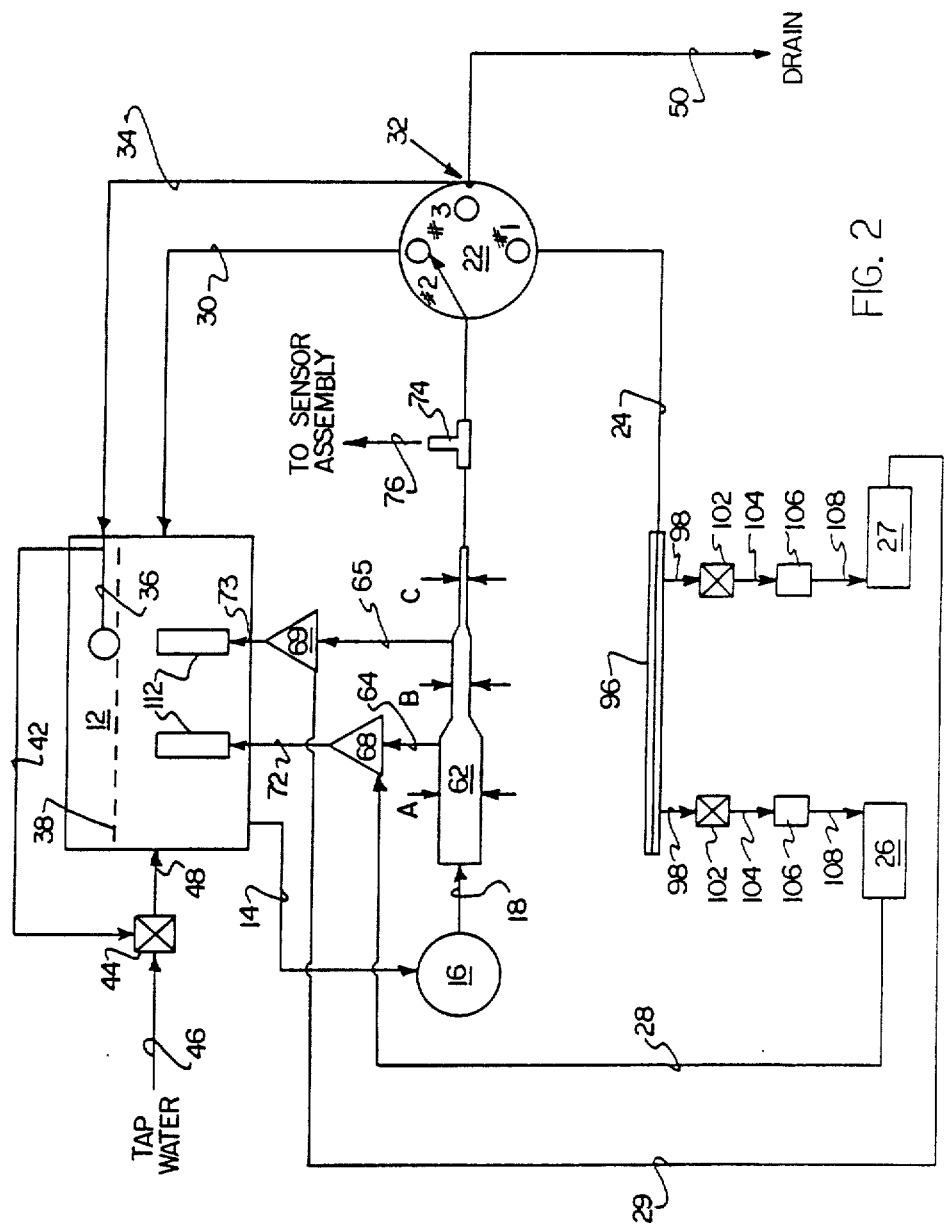

Turning to FIG. 5, a longitudinal, section view of the fluidic pump of FIG. 4 is shown. Injector body 120 includes an extended restrictor nozzle 142. In the preferred embodiment, the inside diameter of restrictor nozzle 142 is one-quarter inch and the outside diameter is one-half inch.

Venturi body 122 includes an inlet chamber 144. In the preferred embodiment, the diameter of the inlet chamber 144 is one inch. Venturi body 122 also includes an outlet passage 146. In the preferred embodiment, the inside diameter of outlet passage 146 is 25/64".

Dimensions E and F may be varied to increase or decrease the venturi effect which occurs in inlet chamber 144. However, in the preferred embodiment, dimension F is 1.15 inches and dimension E is 1.19 inches. The angles defined by surfaces 148, 152 and 154 should be approximately 45 degrees. However, in the preferred embodiment, the angle of surface 154 was measured and found to be approximately 59 degrees.

In operation, high pressure (20–35 PSI) fountain solution enters fluidic pump 68 from high pressure line 64. The fountain solution passes through restrictor nozzle 142, inlet chamber 144 and on through outlet passage 146.

The passage of fountain solution at high pressure through inlet chamber 144 cause a vacuum to form in chamber 144 which, in turn, causes fountain solution from return line 28 and solenoid 92 to be pulled into chamber 144. The action of the fluidic pump 68 then causes the fountain solution in the high pressure line 64, and return line 28 to be mixed with alcohol from solenoid outlet line 116.

Certain modifications and improvements will occur to those skilled in the art upon reading of the foregoing description. By way of example, controller 86 could be adapted to receive a signal representative of the operation of solenoid 44 and to provide a feed-forward signal to solenoid 92, thereby allowing at least a partial introduction of isopropyl alcohol prior to the actual measurement of changes in the specific gravity of the solution. It should be understood that all such modifications and improvements have been deleted herein for conciseness and readability but are properly within the scope of the following claims.

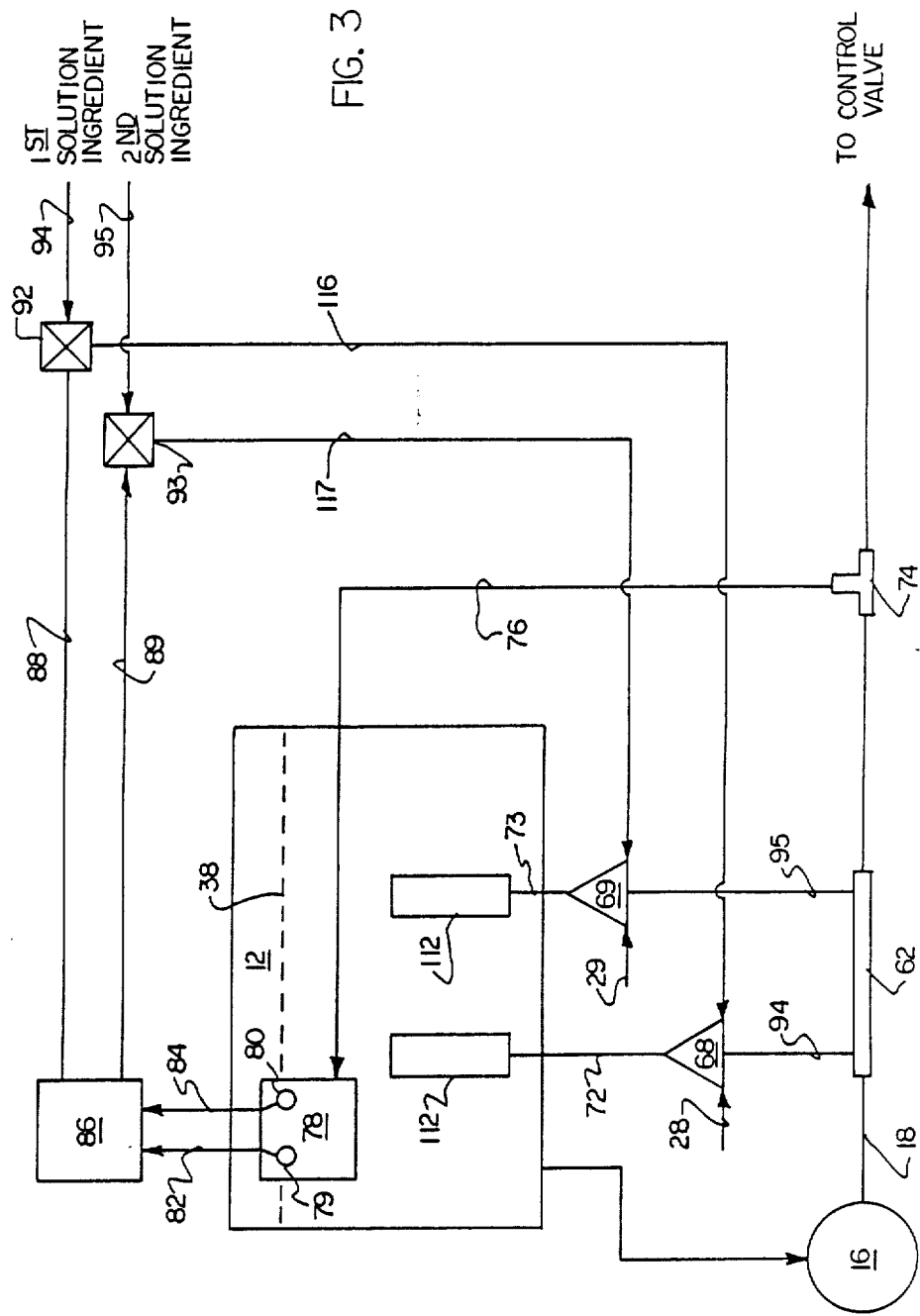

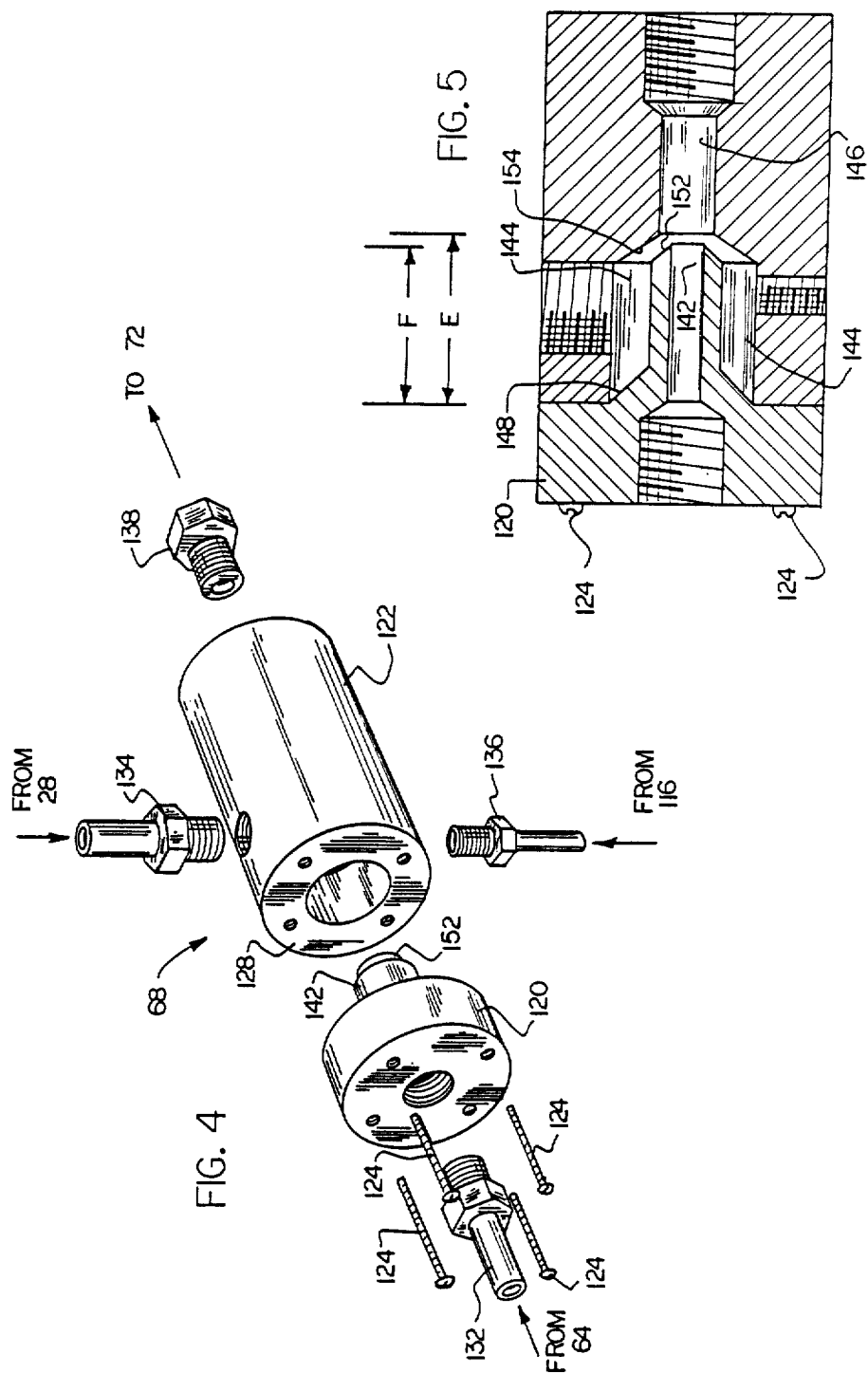

What is claimed is:

1. A system for mixing and supplying a fountain solution, having two or more ingredients mixed in precise concentrations, from a reservoir adapted to hold the solution and a source of at least one of the ingredients of the solution to a printing press, comprising:
    (a) pump means adapted for receiving the solution from the reservoir, returning a portion of the solution to the reservoir, and supplying the remainder of the solution to the press;
    (b) at least one fluidic pump connected between said pump means and the reservoir, said fluidic pump receiving the portion of the solution returning to the reservoir to operate said pump;
    (c) a solution return line connected between the printing press and said fluidic pumps;
    (d) an actuatable valve means connected between the intake of said fluidic pump and the source;
    (e) control means for sensing the concentration of the ingredient in the solution and operatively coupled with said actuatable valve means for controlling the actuation of said valve means in response to the concentration of the ingredient in the solution to maintain its concentration at a pre-set level.

2. The apparatus according to claim 1, further including a Tee-connector located downstream of said pump means for supplying a sample of the solution to said control means.

3. The apparatus according to claim 1, wherein substantially less than half of the solution received by said pump means from the reservoir is supplied to the press.

4. The apparatus according to claim 1, wherein said means operatively coupled with said actuatable valve means for controlling the actuation of said valve means in response to the concentration of the ingredient in the solution is a programmable controller.

5. The apparatus according to claim 1, wherein the source of at least one of the ingredients of the solution includes fountain etch concentrate.

6. The apparatus according to claim 5, wherein said means for sensing the concentration of the ingredient in the solution is a pH sensor for sensing the pH value of the solution, said pH being indicative of the concentration of the fountain etch concentrate in the solution, and providing a control signal proportional thereto.

7. The apparatus according to claim 1, wherein the source of at least one of the ingredients of the solution includes isopropyl alcohol.

8. The apparatus according to claim 7, wherein said means for sensing the concentration of the ingredient in the solution is a specific gravity sensor for sensing the specific gravity value of the solution, said specific gravity value being indicative of the concentration of the isopropyl alcohol in the solution, and providing a control signal proportional thereto.

9. A circulation system for a fountain solution supply system for a printing press, comprising:
    (a) a reservoir adapted to hold the solution;
    (b) pump means adapted for receiving the solution from said reservoir, returning a portion of the solution to said reservoir, and supplying the remainder of the solution to the press;
    (c) at least one fluidic pump connected between said pump means and said reservoir; and (d) a flow control valve located between said pump means and the press for receiving the solution from said pump means and having a first position for returning the solution to said reservoir, a second position for supplying the solution to the press, and a third position for discharging the solution to a waste drain.

10. The apparatus according to claim 9, further including a solution return line connected between the printing press and said fluidic pump.

11. The apparatus according to claim 9, wherein the rate of flow of the portion of the solution returned to said reservoir is sufficient to approximately equal half the capacity of said reservoir every 30 seconds.

12. The apparatus according to claim 9, wherein substantially less than half of the solution received by said pump means from said reservoir is supplied to the press.

13. The apparatus according to claim 9, wherein said pump means includes a pump for receiving the solution from said reservoir and an equalizing flow tap located downstream of said pump for receiving the solution from said pump, returning a portion of the solution to said reservoir, and supplying the remainder of the solution to the press.

14. The apparatus according to claim 13, wherein said equalizing flow tap located downstream of said pump includes an inlet chamber for receiving the solution from said pump, at least one high-pressure outlet for returning a portion of the solution to said reservoir, and a low-pressure outlet for supplying the remainder of the solution to the press.

15. The apparatus according to claim 9, wherein said reservoir includes a water inlet line, a electrically-actuated flow valve located between said line and said reservoir, and a float and switch assembly adapted to actuate said flow valve when the level of solution in said reservoir falls below a pre-determined.

16. A fountain solution supply system for mixing and supplying a fountain solution, having two or more ingredients mixed in precise concentrations, and as source of at least one of the ingredients of the solution to a printing press, comprising:
(a) a reservoir adapted to hold the solution;
(b) pump means adapted for receiving the solution from said reservoir, returning a portion of the solution to said reservoir, and supplying the remainder of the solution to the press;
(c) at least one fluidic pump connected between said pump means and said reservoir, said fluidic pump receiving the portion of the solution returning to the reservoir to operate said pump;
(d) a solution return line connected between the printing press and said fluidic pump;
(e) an actuatable valve means connected between the intake of said fluidic pump and the source; and
(f) control means for sensing the concentration of the ingredient in the solution and operatively coupled with said actuatable valve means for controlling the actuation of said valve means in response to the concentration of the ingredient in the solution to maintain its concentration at a pre-set level.

17. The apparatus according to claim 16, wherein the rate of flow of the portion of the solution returned to said reservoir is sufficient to approximately equal half the capacity of said reservoir every 30 seconds.

18. The apparatus according to claim 16, wherein substantially less than half of the solution received by said pump means from said reservoir is supplied to the press.

19. The apparatus according to claim 16, wherein said pump means includes a pump for receiving the solution from said reservoir and an equalizing flow tap located downstream of said pump for receiving the solution from said pump, returning a portion of the solution to said reservoir, and supplying the remainder of the solution to the press.

20. The apparatus according to claim 19, wherein said equalizing flow tap located downstream of said pump includes an inlet chamber for receiving the solution from said pump, at least one high-pressure outlet for returning a portion of the solution to said reservoir, and a low-pressure outlet for supplying the remainder of the solution to the press.

21. The apparatus according to claim 16, further including a flow control valve located between said pump means and the press for receiving the solution from said pump means and having a first position for returning the solution to said reservoir and a second position for supplying the solution to the press.

22. The apparatus according to claim 21, wherein said flow control valve includes a third position for discharging the solution to a waste drain.

23. The apparatus according to claim 16, wherein said reservoir includes a water inlet line, a electrically-actuated flow valve located between said line and said reservoir, and a float and switch assembly mounted within said reservoir, said assembly being adapted to actuate said flow valve when the level of solution in said reservoir falls below a pre-determined level.

24. The apparatus according to claim 16, further including a Tee-connector located downstream of said pump means for supplying a sample of the solution to said control means.

25. The apparatus according to claim 16, wherein said means operatively coupled with said actuatable valve means for controlling the actuation of said valve means in response to the concentration of the ingredient in the solution is a programmable controller.

26. The apparatus according to claim 16, wherein the source of at least one of the ingredients of the solution to a printing press includes fountain etch concentrate.

27. The apparatus according to claim 26, wherein said means for sensing the concentration of the ingredient in the solution is a pH sensor for sensing the pH value of the solution, said pH being indicative of the concentration of the fountain etch concentrate in the solution, and providing a control signal proportional thereto.

28. The apparatus according to claim 16, wherein the source of at least one of the ingredients of the solution to a printing press includes isopropyl alcohol.

29. The apparatus according to claim 28, wherein said means for sensing the concentration of the ingredient in the solution is a specific gravity sensor for sensing the specific gravity value of the solution, said specific gravity value being indicative of the concentration of the isopropyl alcohol in the solution, and providing a control signal proportional thereto.

30. The apparatus according to claim 16, further including refrigeration means located adjacent to said reservoir for maintaining the temperature of the fountain solution in said reservoir at a pre-determined value.

31. A method of mixing and supplying a fountain solution, having two or more ingredients mixed in precise concentrations, from a reservoir adapted to hold the solution and a source of at least one of the ingredients of the solution to a printing press, comprising the steps of:

(a) receiving the solution from the reservoir;
(b) returning a portion of the solution to the reservoir through at least one fluidic pump connected to the reservoir to operate said pump;
(c) supplying the remainder of the solution to the press;
(d) returning the excess solution from the printing press to said fluidic pump;
(e) sensing the concentration of the ingredient in the solution; and
(f) controlling the actuation of an actuatable valve means connected between the intake of said fluidic pump and the source in response to the concentration of the ingredient in the solution to maintain its concentration at a present level.

32. The method according to claim 31, wherein substantially less than half of the solution received from the reservoir is supplied to the press.

33. The method according to claim 31, wherein the source of at least one of the ingredients of the solution includes fountain etch concentrate.

34. The method according to claim 33, wherein said step of sensing the concentration of the ingredient in the solution includes sensing the pH value of the solution, said pH being indicative of the concentration of the fountain etch concentrate in the solution, and providing a control signal proportional thereto.

35. The method according to claim 31, wherein the source of at least one of the ingredients of the solution includes isopropyl alcohol.

36. The method according to claim 35, wherein said step of sensing the concentration of the ingredient in the solution includes sensing the specific gravity value of the solution, said specific gravity value being indicative of the concentration of the isopropyl alcohol in the solution, and providing a control signal proportional thereto.

37. A method of circulating a fountain solution in a fountain solution supply system for a printing press, comprising the steps of:

(a) supplying the solution to a reservoir adapted to hold the solution;
(b) receiving the solution from said reservoir;
(c) returning a portion of the solution to said reservoir through at least one fluidic pump connected to said reservoir; and
(d) selectively supplying the remainder of the solution to the reservoir, the press or a waste drain.

38. The method according to claim 37, further including the step of returning the excess solution from the printing press to said fluidic pump.

39. The method according to claim 37, wherein the rate of flow of the portion of the solution returned to said reservoir is sufficient to approximately equal half the capacity of said reservoir every 30 seconds.

40. The method according to claim 37, wherein substantially less than half of the solution received from said reservoir is supplied to the press.

41. A method of mixing and supplying a fountain solution, having two or more ingredients mixed in precise concentrations, and a source of at least one of the ingredients of the solution to a printing press, comprising the steps of:

(a) supplying the solution to a reservoir adapted to hold the solution;
(b) returning a portion of the solution to the reservoir through at least one fluidic pump connected to the reservoir to operate said pump;
(c) supplying the remainder of the solution to the press;
(d) returning the excess solution from the printing press to said fluidic pump;
(e) sensing the concentration of the ingredient in the solution; and
(f) controlling the actuation of an actuable valve means connected between the intake of said fluidic pump and the source in response to the concentration of the ingredient in the solution to maintain its concentration at a present level.

42. The method according to claim 41, wherein the rate of flow of the portion of the solution returned to said reservoir is sufficient to approximately equal half the capacity of said reservoir every 30 seconds.

43. The method according to claim 41, wherein substantially less than half of the solution received from said reservoir is supplied to the press.

44. The method according to claim 41, wherein the source of at least one of the ingredients of the solution includes fountain etch concentrate.

45. The method according to claim 44, wherein the step of sensing the concentration of the ingredient in the solution includes sensing the pH value of the solution, said pH being indicative of the concentration of the fountain etch concentrate in the solution, and providing a control signal proportional thereto.

46. The method according to claim 41, wherein the source of at least one of the ingredients of the solution includes isopropyl alcohol.

47. The method according to claim 46, wherein the step of sensing the concentration of the ingredient in the solution includes sensing the specific gravity value of the solution, said specific gravity being indicative of the concentration of the isopropyl alcohol in the solution, and providing a control signal proportional thereto.

48. The method according to claim 41, further including the step of maintaining the temperature of the fountain solution in said reservoir at a pre-determined value.

49. A fountain solution supply system for mixing and supplying a fountain solution, having two or more ingredients mixed in precise concentration, and a source of at least one of the ingredients of the solution to a printing press, comprising:

(a) a reservoir adapted to hold the solution;
(b) pump means adapted for receiving the solution from said reservoir, returning a portion of the solution to said reservoir, and supplying the remainder of the solution to the press;
(c) at least one fluidic pump connected between said pump means and said reservoir, said fluidic pump receiving the portion of the solution returning to the reservoir to operate said pump;
(d) a flow control valve located between said pump means and the press for receiving the solution from said pump means and having a first position for returning the solution to said reservoir, a second position for supplying the solution to the press, and a third position for discharging the solution to a waste drain;
(e) an actuatable valve means connected between the intake of said fluidic pump and the source; and
(f) control means for sensing the concentration of the ingredient in the solution and operatively coupled with said actuatable valve means for controlling the actuation of said valve means in response to the concentration of the ingredient in the solution to maintain its concentration at a pre-set level.

* * * * *

UNITED STATES PATENT AND TRADEMARK OFFICE
CERTIFICATE OF CORRECTION

PATENT NO. : 4,969,480

DATED : November 13, 1990

INVENTOR(S) : Kenneth D. Hughes

It is certified that error appears in the above-identified patent and that said Letters Patent is hereby corrected as shown below:

Title page:

The sheets of Drawing consisting of figs. 1-5, should be added as shown on the attached sheet.

Signed and Sealed this

Twelfth Day of May, 1992

Attest:

DOUGLAS B. COMER

*Attesting Officer*     Acting Commissioner of Patents and Trademarks

United States Patent [19]

Hughes

[11] Patent Number: 4,969,480
[45] Date of Patent: Nov. 13, 1990

[54] METHOD AND APPARATUS FOR MIXING AND SUPPLYING FOUNTAIN SOLUTION TO PRINTING PRESS

[76] Inventor: Kenneth D. Hughes, P.O. Box 1186, Eden, N.C. 27288

[21] Appl. No.: 182,939

[22] Filed: Apr. 18, 1988

[51] Int. Cl.$^5$ .................... G05D 11/06; G05D 11/08
[52] U.S. Cl. .......................................... 137/3; 137/5; 137/91; 137/93; 137/563
[58] Field of Search .................. 137/3, 5, 91, 93, 563

[56] References Cited

U.S. PATENT DOCUMENTS

| | | | |
|---|---|---|---|
| 3,376,883 | 4/1968 | Douty | 137/93 X |
| 3,557,817 | 1/1971 | Royse | 137/91 |
| 3,947,356 | 3/1976 | Werhli | 137/93 X |
| 4,119,989 | 10/1978 | Carvalko | 137/93 X |
| 4,483,357 | 11/1984 | Rao | 137/91 X |

*Primary Examiner*—Robert G. Nilson
*Attorney, Agent, or Firm*—Rhodes, Coats & Bennett

[57] ABSTRACT

A fountain solution supply system for mixing and supplying a fountain solution, having two or more ingredients mixed in precise concentrations, from a reservoir to a printing press. The system includes a high-capacity pump connected to the reservoir. Substantially more than half of the flow of the fountain solution from the pump is directed through a high pressure line to operate a fluidic pump and then returned to the reservoir. The remainder of the fountain solution is directed through a low pressure line to the printing press. The return line from the printing press is connected to a primary intake of the fluidic pump. An electrically-activated, solenoid valve is connected between a secondary intake of the fluidic pump and a supply of at least one of the ingredients of the solution. Control means sense the concentration of the ingredient in the solution and control the actuation of the valve in response to the concentration of the ingredient in the fountain solution to maintain its concentration at a pre-set level.

49 Claims, 4 Drawing Sheets

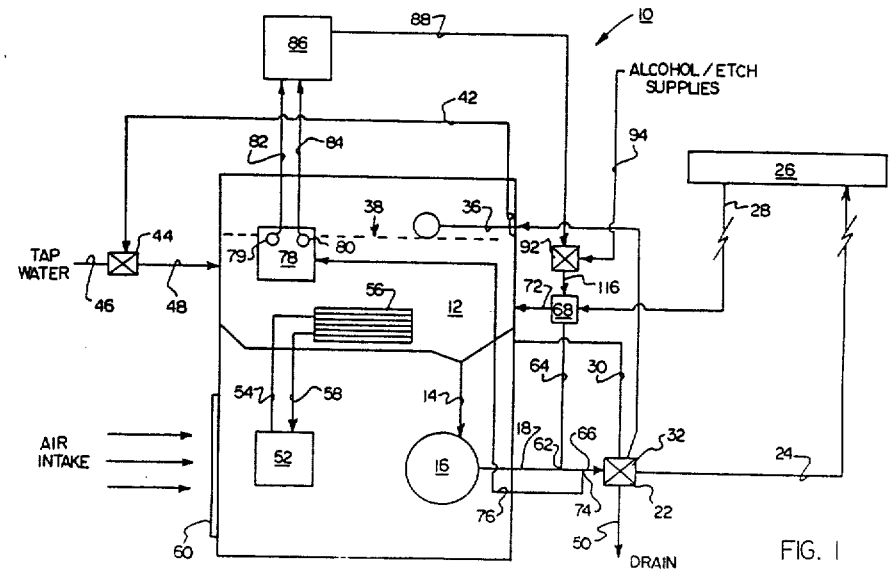

FIG. 1